United States Patent [19]
Allen

[11] Patent Number: 5,667,443
[45] Date of Patent: *Sep. 16, 1997

[54] BOLT INCLUDING A CLEANING THREAD POINT TIP

[75] Inventor: John Allen, Clarkston, Mich.

[73] Assignee: Ring Screw Works, Madison Heights, Mich.

[*] Notice: The portion of the term of this patent subsequent to Apr. 12, 2015, has been disclaimed.

[21] Appl. No.: 335,448

[22] Filed: Nov. 7, 1994

Related U.S. Application Data

[63] Continuation of Ser. No. 103,906, Aug. 10, 1993, Pat. No. 5,374,146.

[51] Int. Cl.⁶ .............................. B21H 3/02; B23G 9/00; F16B 25/00; F16B 35/04
[52] U.S. Cl. .............................. 470/12; 470/8; 411/386; 411/418
[58] Field of Search .................... 470/8–12, 16, 470/70, 65, 66, 71, 84, 86; 411/386, 418, 411

[56] References Cited

U.S. PATENT DOCUMENTS

| | | | |
|---|---|---|---|
| 2,823,574 | 2/1958 | Rosan | 411/386 |
| 3,451,080 | 6/1969 | McIntyre et al. | 470/10 |
| 3,492,908 | 2/1970 | Thurston | 470/9 |
| 5,000,639 | 3/1991 | Hinkley et al. | 411/418 |

*Primary Examiner*—Lowell A. Larson
*Assistant Examiner*—Rodney Butler
*Attorney, Agent, or Firm*—Harness, Dickey & Pierce, P.L.C.

[57] ABSTRACT

A fastener has a head and a shank with two ends. One of the ends includes the head while the other includes a pilot point. Also, the shank includes a threaded portion adjacent to the pilot point. A pair of recesses are formed 180° from one another on the point and threaded portion. The recesses extend from the end of the point through at least a first full thread.

7 Claims, 1 Drawing Sheet

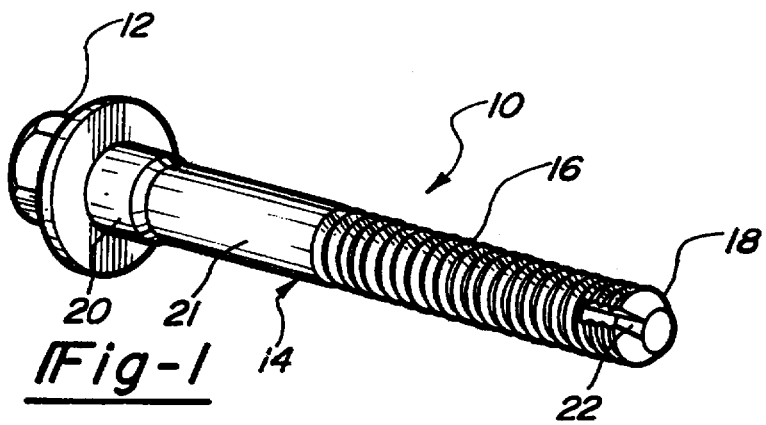
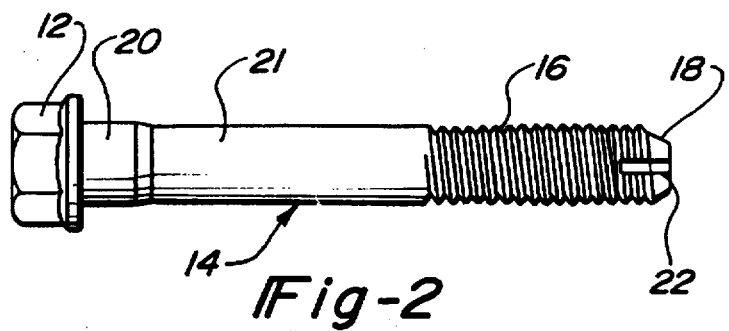
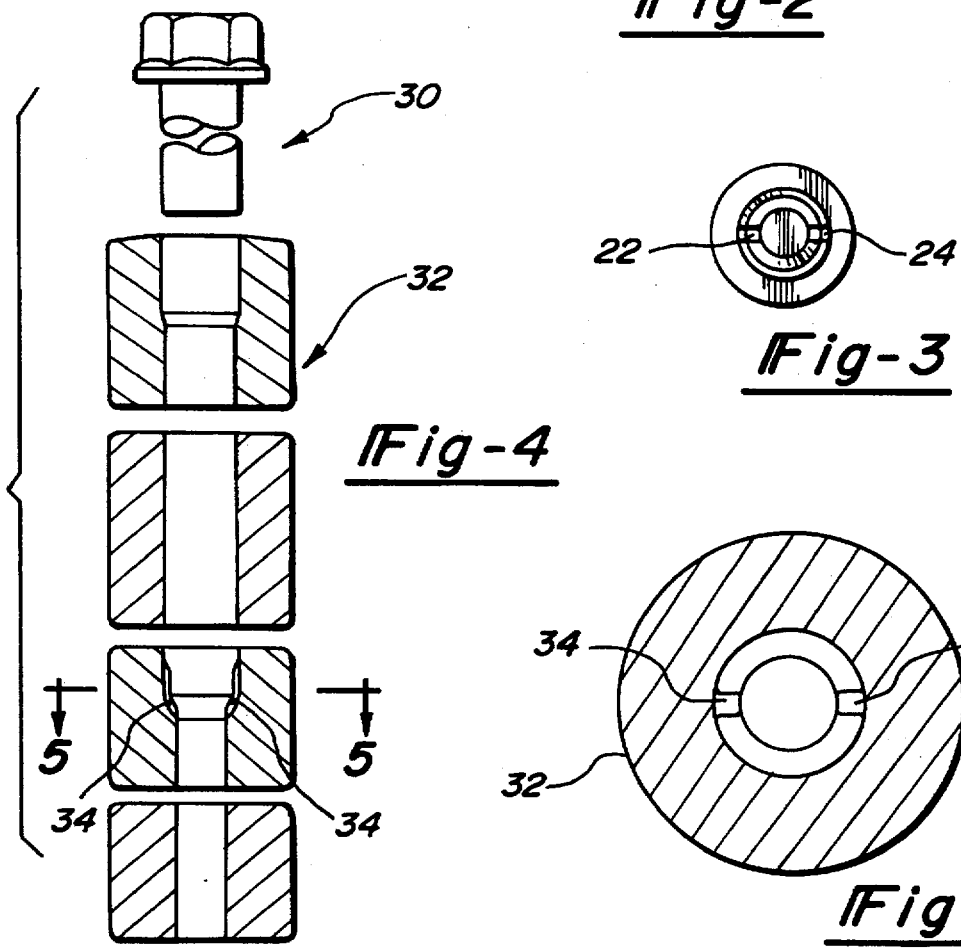

BOLT INCLUDING A CLEANING THREAD POINT TIP

This is a continuation of U.S. patent application Ser. No. 103,906, filed Aug. 10, 1993, now U.S. Pat. No. 5,374,146.

BACKGROUND OF THE INVENTION

The present invention relates to fasteners and, more particularly, to bolts with a cleaning point.

When a bolt is screwed into a threaded port, where the port is subjected to foreign material such as dust, dirt, metal shavings or the like, the foreign material is carried into the mating area between the external and internal threads as the bolt or fastener is threaded into the port. If foreign material is carried into the threads, galling and/or seizing usually results during assembly. This galling and seizing of the bolts causes substantial down time during an assembly operation, since the seized fastener must be removed, the hole cleaned out, and a replacement fastener installed.

Various types of fasteners have been utilized to eliminate the foreign material which would otherwise be carried into the mating area between the internal and external threads. These threaded bolts generally include a recess or space in its threads to enable the foreign material to accumulate in the recesses. Generally, a bolt includes a multiplicity of flutes or recesses which are equally spaced and extend deeply into the threads. Sometimes the flutes are formed at an angle with respect to the axis of the fastener. Also, some of these fasteners include pilot points to enable the fastener to easily enter the threaded ports.

While these types of fasteners are adequate for performing their function, designers are striving to improve the art.

SUMMARY OF THE INVENTION

The present invention provides the art with a fastener which, when entering a tapped port, accumulates foreign material that would otherwise be carried into the mating area between the external and internal threads. The invention provides recesses, approximately 180° apart, which enable the material, when the fastener is threaded into the port, to receive the foreign material. The invention provides recesses or flutes which extend from the end of the pilot tip into at least the first full thread of the threaded shank portion of the bolt. Thus, the present invention provides a fastener which substantially prevents foreign material from being carried into the threads which, in turn, eliminates galling and seizing during assembly.

From the following detailed description taken in conjunction with the accompanying drawings and subjoined claims, other objects and advantages of the present invention will become apparent to those skilled in the art.

BRIEF DESCRIPTION OF THE DRAWINGS

FIG. 1 is a perspective view of a fastener in accordance with the present invention.

FIG. 2 is a side plan view of the fastener of FIG. 1.

FIG. 3 is an end plan view of the fastener of FIG. 2.

FIG. 4 is a cross sectional view of dies for manufacturing the fastener of FIG. 1.

FIG. 5 is a cross sectional view of FIG. 4 along line 5—5 thereof.

DETAILED DESCRIPTION OF THE PREFERRED EMBODIMENT

Turning to the figures, particularly FIG. 1, a fastener is illustrated as a bolt designated with the reference numeral 10. The bolt 10 includes a head 12, a shank 14, which includes threaded portion 16, and a pilot tip 18.

The head 12 is generally designed to fit a common tool for tightening the bolt 10. The shank 14 includes a first portion 20 having a diameter slightly larger than the remainder or second portion 21 of the shank 14. The threaded portion 16 extends from the shank second portion 21 to the pilot tip 18. The threads on the threaded portion 16 may be any type of conventional threads.

The pilot tip 18 is angled with respect to the shank axis at an angle of about 55° to 65°. The pilot tip enables the bolt to easily enter into threaded ports.

A pair of recesses or flutes 22 and 24 extend from the end of the pilot tip 18 into the threaded portion 16. Generally, the recesses or flutes 22 and 24 extend from the tip end to at least the first full thread and preferably to and through the second full thread, but not beyond the third full thread. Recesses or flutes 22 and 24 have an overall rectangular shape, when viewed in plan, and are spaced approximately 180° apart (see FIG. 3). The recesses 22 and 24 are of a uniform depth and follow along both the pilot tip 18 and the shank threaded portion 16. Also, the recesses 22, 24 have a width which is about 20% to 33% of the nominal diameter length of the shank 14. Preferably, the width of the recesses is about 22% to 32% of the nominal diameter and most preferred at about 25%.

Turning to FIGS. 4 and 5, dies are illustrated for manufacturing the fastener as described above. First, a blank 30 including a head and an unthreaded shank of a desired diameter is provided. The unthreaded fastener is forced into the dies 32 to form an unthreaded fastener having a desired shank diameter as well as a pilot tip 18. Also, simultaneously with forming the tip 18, the recesses 22 and 24 are formed in the unthreaded blank 30. As can be seen from the dies 32, the members 34 extend a uniform distance into the die aperture which, in turn, form a uniform depth recess in the tip 18 and shank 14. Also, as can be seen in FIG. 5, the members 34 have an overall rectangular shape to form the rectangular recesses.

After the recesses are formed in the shank and pilot tip, the threads are rolled onto the shank. After rolling the threads, if desired, a coating, lubricant, or the like may be added to threads. After this process, the bolt is formed like that illustrated in FIG. 1.

The present bolt provides a recess to accumulate foreign material that would otherwise be carried into the mating area between the external and internal threads. Thus, the present invention eliminates the possibility of galling and seizing which happens when foreign material is carried into the threads during assembly. By eliminating the galling and seizing, the bolt provides a simple solution which reduces the possibility of down time during an assembly operation.

While the above detailed description describes the preferred embodiment of the present invention, the invention is susceptible to modification, variation, and alteration without deviating from the scope and fair meaning of the subjoined claims.

I claim:

1. A method of manufacturing a fastener comprising:

providing a blank having a head and an unthreaded shank;

positioning said blank into die means;

forming a tip and at least one recess in said tip and shank; and forming threads on said shank adjacent said tip such that said at least one recess extends from said tip through at least a first full thread.

2. The method of forming a fastener according to claim 1, further comprising forming said at least one recess to have an overall rectangular shape.

3. The method of forming a fastener according to claim 1, further comprising forming said at least one recess in said shank and tip with a uniform depth.

4. The method of forming a fastener according to claim 1, further comprising forming said at least one recess following a contour of the unthreaded shank and tip.

5. The method of forming a fastener according to claim 1, wherein said at least one recess has a width with a size equal to about 20% to 33% of a diameter of said shank.

6. The method of forming a fastener according to claim 1, further comprising forming a pair of recesses in said tip and shank.

7. The method of forming a fastener according to claim 1, further comprising simultaneously forming said tip and at least one recess in said unthreaded shank.

* * * * *